US009854620B2

United States Patent
Wilhelmsson et al.

(10) Patent No.: US 9,854,620 B2
(45) Date of Patent: Dec. 26, 2017

(54) CONNECTION SETUP BETWEEN A MOBILE TERMINAL AND A MOVING BASE STATION BASED ON JOINT MOVEMENT DETECTION

(71) Applicant: Telefonaktiebolaget LM Ericsson (publ), Stockholm (SE)

(72) Inventors: Leif Wilhelmsson, Dalby (SE); Mattias Bergstrom, Stockholm (SE); Filip Mestanov, Sollentuna (SE); Hakan Persson, Solna (SE)

(73) Assignee: TELEFONAKTIEBOLAGET LM ERICSSON, Stockholm (SE)

( * ) Notice: Subject to any disclaimer, the term of this patent is extended or adjusted under 35 U.S.C. 154(b) by 0 days.

(21) Appl. No.: 15/128,982

(22) PCT Filed: Mar. 26, 2014

(86) PCT No.: PCT/EP2014/056071
§ 371 (c)(1),
(2) Date: Sep. 25, 2016

(87) PCT Pub. No.: WO2015/144216
PCT Pub. Date: Oct. 1, 2015

(65) Prior Publication Data
US 2017/0111954 A1    Apr. 20, 2017

(51) Int. Cl.
*H04W 4/00* (2009.01)
*H04W 76/02* (2009.01)
(Continued)

(52) U.S. Cl.
CPC ......... *H04W 76/027* (2013.01); *H04W 48/20* (2013.01); *H04W 64/006* (2013.01); *H04W 84/005* (2013.01)

(58) Field of Classification Search
CPC .............................. H04W 84/045; Y02B 60/50
(Continued)

(56) References Cited

U.S. PATENT DOCUMENTS

2009/0104911 A1    4/2009  Watanabe et al.
2010/0056136 A1*   3/2010  Zhu ..................... H04B 7/2606
                                                     455/426.1
(Continued)

FOREIGN PATENT DOCUMENTS

EP    1850626 A1    10/2007
EP    2112858 A1    10/2009
(Continued)

OTHER PUBLICATIONS

PCT International Search Report, dated Dec. 12, 2014, in connection with International Application No. PCT/EP2014/056071, all pages.
(Continued)

*Primary Examiner* — Kiet Doan
(74) *Attorney, Agent, or Firm* — Leffler Intellectual Property Law, PLLC

(57) ABSTRACT

A method in a base station is disclosed for determining connection establishment between the base station and a mobile terminal, where the base station is moving. When the base station receives a first connection request, the base station refrains from establishing a connection between the base station and the mobile terminal. When the base station receives a second connection request from the mobile terminal, the base station determines whether or not to establish the connection between the base station and the mobile terminal.

13 Claims, 6 Drawing Sheets

(51) Int. Cl.
*H04W 48/20* (2009.01)
*H04W 64/00* (2009.01)
*H04W 84/00* (2009.01)

(58) Field of Classification Search
USPC ............ 455/404.1, 566, 450, 466, 437, 418, 455/426.1, 574, 410; 370/329, 328, 351
See application file for complete search history.

(56) References Cited

U.S. PATENT DOCUMENTS

| | | | |
|---|---|---|---|
| 2011/0207468 A1* | 8/2011 | Nakamura | ........ H04W 52/0274 455/450 |
| 2011/0275378 A1 | 11/2011 | Kwon et al. | |
| 2012/0087303 A1 | 4/2012 | Kwon et al. | |
| 2013/0059589 A1 | 3/2013 | Dalsgaard et al. | |
| 2013/0115945 A1 | 5/2013 | Holostov et al. | |
| 2013/0171995 A1 | 7/2013 | Fujishiro et al. | |
| 2015/0173017 A1* | 6/2015 | Rakotoharison | ........ H04W 8/08 370/311 |

FOREIGN PATENT DOCUMENTS

| | | |
|---|---|---|
| EP | 2136598 A1 | 12/2009 |
| EP | 2424321 A1 | 2/2012 |
| WO | 2011020481 A1 | 2/2011 |

OTHER PUBLICATIONS

PCT Written Opinion, dated Dec. 12, 2014, in connection with International Application No. PCT/EP2014/056071, all pages.

Hongxia Zhao et al., Handoff for Wireless Networks with Mobile Relay Stations, IEEE WCNC 2011—Network, pp. 826-831.

Yutao Sul et al., Moving Cells: A Promising Solution to Boost Performance for Vehicular Users, Heterogeneous and Small Cell Networks, IEEE Communications Magazine, Jun. 2013, pp. 62-68.

* cited by examiner

CONNECTION SETUP BETWEEN A MOBILE TERMINAL AND A MOVING BASE STATION BASED ON JOINT MOVEMENT DETECTION

TECHNICAL FIELD

Embodiments herein relate generally to a mobile terminal, a base station and a wireless communication system and methods therein. In particular embodiments relate to determining whether or not a mobile terminal should connect to a moving base station.

BACKGROUND

Mobile terminals for communication such as wireless devices are also known as e.g. User Equipments (UE), wireless terminals and/or mobile stations. Mobile terminals are enabled to communicate wirelessly in a wireless communications system or cellular communication network, sometimes also referred to as a cellular radio system or cellular networks. The communication may be performed e.g. between two mobile terminals, between a terminal and a regular telephone and/or between a terminal and a server via a Radio Access Network (RAN) and possibly one or more core networks, comprised within the cellular communications network.

Mobile terminals may further be referred to as mobile telephones, cellular telephones, laptops, or tablet computers with wireless capability, just to mention some further examples. The mobile terminals in the present context may be, for example, portable, pocket-storable, hand-held, computer-comprised, or vehicle-mounted mobile devices, enabled to communicate voice and/or data, via the RAN, with another entity, such as another terminal or a server.

The wireless communication system covers a geographical area which is divided into cell areas, wherein each cell area being served by a base station, e.g. a Radio Base Station (RBS), which sometimes may be referred to as e.g. "eNB", "eNodeB", "NodeB", "B node", Base Transceiver Station (BTS), or Access Point (AP), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for mobile terminals. The 3GPP has undertaken to evolve further the UTRAN and GSM based radio access network technologies.

3GPP LTE radio access standard has been written in order to support high bitrates and low latency both for uplink and downlink traffic. All data transmission is in LTE controlled by the radio base station.

In a wireless communication system, when a mobile terminal is connected to a base station, it is important, from a performance point of view, that the mobile terminal is connected to the most suitable base station. Often the most suitable base station is the one from which the mobile terminal receives the best signal quality and/or strongest received signal strength. Better signal quality and/or strongest received signal strength in general means that a higher data rate can be supported, that the delay is smaller, and/or in general that the relevant Quality of Service (QoS) is better. When the wireless communication system is heavily loaded, it may not be enough to only consider the Signal quality and/or received signal strength as there simply will not be sufficient available resources. These resources may either be in an access link between the mobile terminal and the base station, and/or it may be in the wireless communication system connecting different base stations to each other.

In practise, to ensure that the mobile terminal is connected to the most suitable base station, the mobile terminal may scan for signals from different base stations within radio range and then try to connect to most suitable base station. Here, most suitable base station may for instance be the base station that is expected to provide the best QoS for the mobile terminal.

As the mobile terminal moves, it may find that the base station it is presently connected to is no longer the most suitable, and therefore the mobile terminal may be handed over from one base station to another. This Handover (HO) procedure target is that the mobile terminal is always connected to the most suitable base station. However, the HO procedure comes at a cost as the mobile terminal needs to perform measurements, which are of no use in case a HO will not be performed, and it also takes resources from the wireless communication system to perform the handover.

In addition, for certain applications with stringent requirements a HO may be hard to perform without causing a glitch or interruption in the communication. For this reason, it may actually be preferred that the mobile terminal remains connected to one base station for a longer time than to continuously perform handovers between different base stations just to ensure that the mobile terminal is connected to the very best one. Specifically, in case the mobile terminal is moving fast and the coverage area of the base station is small it is not a good solution to connect to another base station as the time duration between HOs in this case may be expected to be rather small. To address this problem, the wireless communication system should preferably have at least some cells that are large, i.e., macro cells, which fast moving mobile terminals may connect to, whereas slowly moving or stationary mobile terminals may connect to smaller cells, for instance micro- or pico cells. In case the mobile terminal is in idle mode and performs cell reselection similar aspects apply.

Today, some mobile terminals support several Radio Access Technologies (RAT), and in particular cellular access standards such as WCDMA and LTE as well as Wireless Local Area Network (WLAN) access are supported. This means that when the mobile terminal is scanning for being connected to the most suitable base station it may be even more challenging as the base station may either be a WLAN Access Point (AP) or a base station in a cellular communications network. Typically the WLAN AP will have a rather limited coverage area, and therefore it is not suitable for the mobile terminal to connect to the WLAN AP if the mobile terminal is moving fast. In fact, in order to save power, the mobile terminal may determine not to scan for WLAN APs when the mobile terminal is moving fast because it may then result in two HOs, i.e. one to and one from the WLAN AP, and the mobile terminal is only able to stay connected to the WLAN AP for a very short time.

As mentioned above, to ensure that the mobile terminal is connected to the most suitable base station, the mobile terminal may scan for signals from different base stations within radio range trying to connect to the most suitable one. However, as scanning consumes power, scanning for small cells such as e.g. WLAN APs are typically avoided unless necessary. In particular this may be the preferred setting in case it is known that the mobile terminal is moving at relatively high speed.

A problem is that when also the base stations are moving in the wireless communication system it is difficult to decide which mobile terminal that shall connect to which base station.

SUMMARY

It is therefore an object of embodiments herein to provide a way of improving the performance of a wireless communication system.

According to a first aspect of embodiments herein the object is achieved by a method in a base station for determining connection establishment between the base station and a mobile terminal where the base station is moving.

When the base station receives a first connection request, the base station refrains from establishing a connection between the base station and the mobile terminal.

When the base station receives a second connection request from the mobile terminal, the base station determines whether or not to establish the connection between the base station and the mobile terminal.

According to a second aspect of embodiments herein the object is achieved by a method in a mobile terminal for assisting the base station in determining connection establishment between the mobile terminal and a base station, wherein the base station is moving.

The mobile terminal transmits a first connection request to the base station. If a connection is not established within a time period, the mobile terminal transmits a second connection request to the base station.

At least one of the first connection request and the second connection request comprises a mobility indicator, indicating a speed of the mobile terminal.

According to a third aspect of embodiments herein the object is achieved by a base station adapted to determine connection establishment between the base station and a mobile terminal, where the base station is moving.

The base station comprises a control unit adapted to when the base station is moving, receive a first connection request from the mobile terminal and to refrain from establishing the connection between the base station and the mobile terminal when the first connection request is received.

The control unit is further adapted to when the base station is moving, receive a second connection request from the mobile terminal and determine whether or not to establish the connection between the base station and the mobile terminal when the second connection request is received.

According to a fourth aspect of embodiments herein the object is achieved by a mobile terminal adapted to determine connection establishment between the mobile terminal and a base station, where the base station is moving.

The mobile terminal comprises a control unit for transmit a first connection request to the base station.

If a connection has not been established within a time period, the control unit is further adapted to transmit a second connection request to the base station.

At least one of the first connection request and the second connection request includes a mobility indicator, indicating a speed of the mobile terminal.

According to a fifth aspect of embodiments herein the object is achieved by a method in a communication system for determining connection establishment between a base station and a mobile terminal where the base station is moving.

The mobile terminal transmits, and the base station receives a first connection request.

When the base station receives the first connection request, the base station refrains from establishing a connection between the base station and the mobile terminal.

The mobile terminal transmits, and the base station receives a second connection request. At least one of the first connection request and the second connection request includes a mobility indicator, indicating a speed of the mobile terminal.

When the base station receives the second connection request, the base station determines whether or not to establish the connection between the base station and the mobile terminal based on mobility indicator.

According to a sixth aspect of embodiments herein the object is achieved by a computer program product comprising computer program code for executing the method in the base station when said computer program code is executed by a programmable control unit of the base station.

According to a seventh aspect of embodiments herein the object is achieved by a non-transitory computer readable medium having stored thereon a computer program product comprising computer program code for executing the method in the base station when said computer program code is executed by a programmable control unit of the base station.

According to an eighth aspect of embodiments herein the object is achieved by a computer program product comprising computer program code for executing the method in the mobile terminal when said computer program code is executed by a programmable control unit of the mobile terminal.

According to a ninth aspect of embodiments herein the object is achieved by a non-transitory computer readable medium having stored thereon a computer program product comprising computer program code for executing the method in the mobile terminal when said computer program code is executed by a programmable control unit of the mobile terminal.

Since the base station is able to refrain the mobile terminal from connecting to the base station on the first connection attempt but determine whether or not to establish the connection between the base station and the mobile terminal when a second connection request is received, the risk that the base station will allow mobile terminals that do not move jointly with the base station to connect to the base station is reduced. This will lead to a more efficient handover process in the wireless communication system since fewer handovers will be performed in the wireless communication system.

An advantage with embodiments herein is that less signaling is needed in the wireless communication system since fewer connection requests are sent.

Another advantage with embodiments herein is that the channel conditions for the mobile terminal are improved since the mobile terminal will be connected to the most suitable base station.

A further advantage the mobile terminal will remain connected to the base station during longer time and fewer handovers are needed since the mobile terminal will be connected to the most suitable base station.

A further advantage with embodiments herein is that power consumption of the mobile terminal is decreased since it is connected to the base station with the best channel conditions.

A further advantage is that the base station may determine connection establishment depending on whether or not the mobile terminal is stationary in relation to the base station.

BRIEF DESCRIPTION OF THE DRAWINGS

Examples of embodiments herein are described in more detail with reference to attached drawings in which.

DETAILED DESCRIPTION

Figure 1:
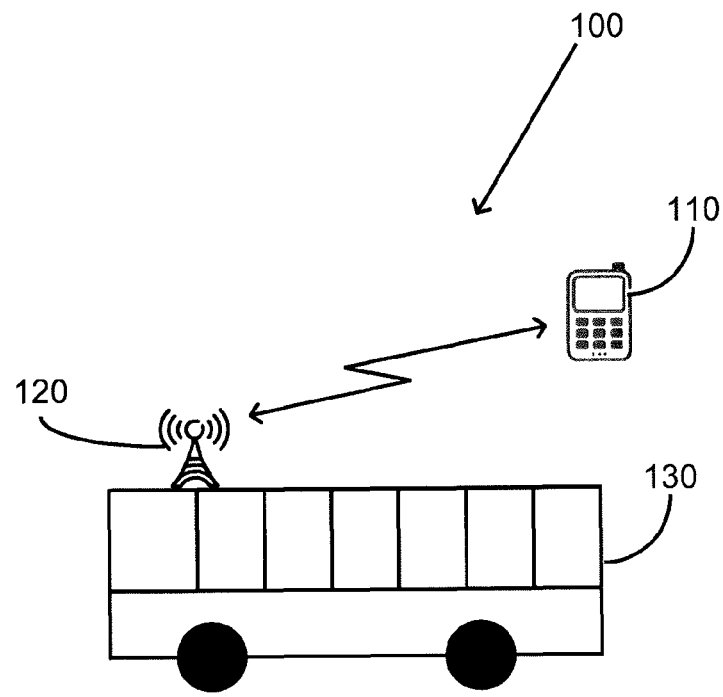
FIG. 1 is a schematic block diagram illustrating the wireless communication system.

As part of developing embodiments herein, some problems will first be identified and discussed.

The inventors have realized that there exist problems with existing solutions for which it is determined whether a connection to a certain base station is suitable or not based on the speed of the mobile terminal and knowledge of the size of the cell covered by the base station. For example, in case also the base station is moving, this will not give the desired result concerning if it is suitable for a certain mobile terminal to connect to the base station. In particular this is the case when the mobile terminal and the base station are moving together, which for instance would be the case if both were located on a moving vehicle.

Prior art algorithms for managing HO between different base stations might not work satisfactory, and in particular the idea that a fast moving mobile terminal should not scan for WLAN APs may in fact cause a significant reduction in performance. Furthermore, even for the approach that scanning should not be performed until it is determined that the present base station no longer can provide the required QoS implies a problem. The reason is that when the mobile terminal is moving within e.g. a bus or a train, channel conditions between the mobile terminal and a base station placed on the bus or train are typically not very good. First, the channel will be fast fading which makes reception more challenging. Second, the signal will be significantly attenuated when going through the wall or roof of the bus or train so that the received signal strength will be weak. This means that the transmitted power of the mobile terminal will be high and thus the power consumption will also be high.

It should be noted that when the term handover or HO is used herein that does not necessarily mean a handover as defined in the 3GPP specifications. The term handover or HO is used in a broader sense and may also refer to when ongoing traffic or later arriving traffic of the mobile terminal is steered from a 3GPP network to a WLAN or vice versa.

A HO is typically triggered when the current connection between the base station and the mobile terminal is considered not to be sufficiently good, e.g. below a threshold, or because a load for that particular base station is too high, e.g. above a threshold. The HO may be triggered by either the base station or the mobile terminal. The need for a HO may be predicted based on how fast the mobile terminal is moving and the coverage area of the base station. Because a HO requires signalling and other resources and increases power consumption, it is desirable to limit the number of HOs. One approach for achieving this is to have a layered network were mobile terminals moving at high speed are connected to base stations with large cells, whereas slowly moving and stationary users are connected to base stations with small cells. Specifically, when the mobile terminal is moving and needs to perform a HO, the mobile terminal may perform measurements and report a signal quality for different base stations to the wireless communication system. The wireless communication system, or a network node in the wireless communication system, may then decide which is the most suitable target base station for the HO. The base station may then take into account that if the mobile terminal is moving, it may be preferable to connect to the base station supporting a larger area although there may be other base stations with better signal quality but with smaller coverage area. Such a decision is quite easily made when the base stations are stationary.

However, there is an increasing number of moving base stations as more and more vehicles such as e.g. buses and trains are equipped with WLAN. For this scenario, algorithms for HO which are designed for stationary base stations are not always working well.

FIG. 1 depicts an example of a wireless communication system 100 according to a scenario in which embodiments herein may be implemented. The wireless communication system 100 is a wireless communication network such as an LTE, WCDMA, GSM network, WLAN network, or any other wireless communication system.

A mobile terminal 110 operates in the wireless communication system 100. The mobile terminal 110 may e.g. be a mobile phone a wireless device, a user equipment, a mobile wireless terminal, a wireless terminal, a WLAN station, a computer such as e.g. a laptop, a Personal Digital Assistants (PDA)s or a tablet computer with wireless capability, or any other radio network unit capable to communicate over a radio link in the wireless communication system 100. Please note the term mobile terminal 110 used in this document also covers other wireless devices such as Machine to machine (M2M) devices, sometimes referred to as "machine type communication" (MTC) devices.

The wireless communication system 100 comprises at least one base station 120 which is movable. The geographical area where radio coverage is provided from the base station 120 will be referred to as a cell. The base station 120 may be a transmission point, a radio base station, a Node B, an eNB, an eNodeB, a WLAN AP, an Home Node B, an Home eNode B or any other network node capable to serve the mobile terminal 110 in the wireless communication system 100.

As stated above the base station 120 is movable. The base station 120 may e.g. be placed on a vehicle 130 such as a car, a bus, a boat, an airplane or a train. In this figure, the base station 120 is located on the outside of a bus mainly for illustration purposes. Typically, the base station 120 would be located inside the moving vehicle, although the disclosed ideas are applicable regardless of whether the base station 120 is located in the inside of the vehicle or on the outside. The base station 120 preferably has a relatively small coverage area only serving mobile terminals 110 in the vicinity of the vehicle 130. The base station 120 may preferably have an antenna within the vehicle 130 for serving the mobile terminals such as the mobile terminal 110 within the vehicle 130. The base station 120 may further have an external antenna e.g. on the roof of the vehicle 130, such as for communicating with other nodes in the wireless communication system 100.

There are an increasing number of small cells, in particular small cells served by WLAN APs that are not stationary but instead movable, e.g. installed on buses, on trains, or in some other way such that the cell is far from being stationary. Embodiments herein provide algorithms for performing handover and/or cell selection and/or reselection, when the base station 120 is not stationary. An example of when embodiments herein are applicable is in a situation when the base station 120 is deployed on board of the vehicle 130 as shown in FIG. 1. When the vehicle 130 makes a stop e.g., at a traffic light, and the mobile terminal 110 is not in the bus but in the vicinity of the bus, e.g. in another vehicle. In this case the mobile terminal 110 may pick up a signal level from the base station 120 and try to connect to it. Since the mobile terminal 110 is in another vehicle than the base station 120 it will probably move in another direction than the base station 120 and a set up connection to the base station 120 will therefore be lost. According to embodiments herein, it will be decided that the mobile terminal 110 should not connect to the base station 120 in that case. This decision may e.g. be based on the relative speed between the mobile terminal 110 and the base station 120. This will be positive with regards to signalling, power consumption, user experience, etc.

Embodiments will be exemplified in a non-limiting description.

Figure 2:
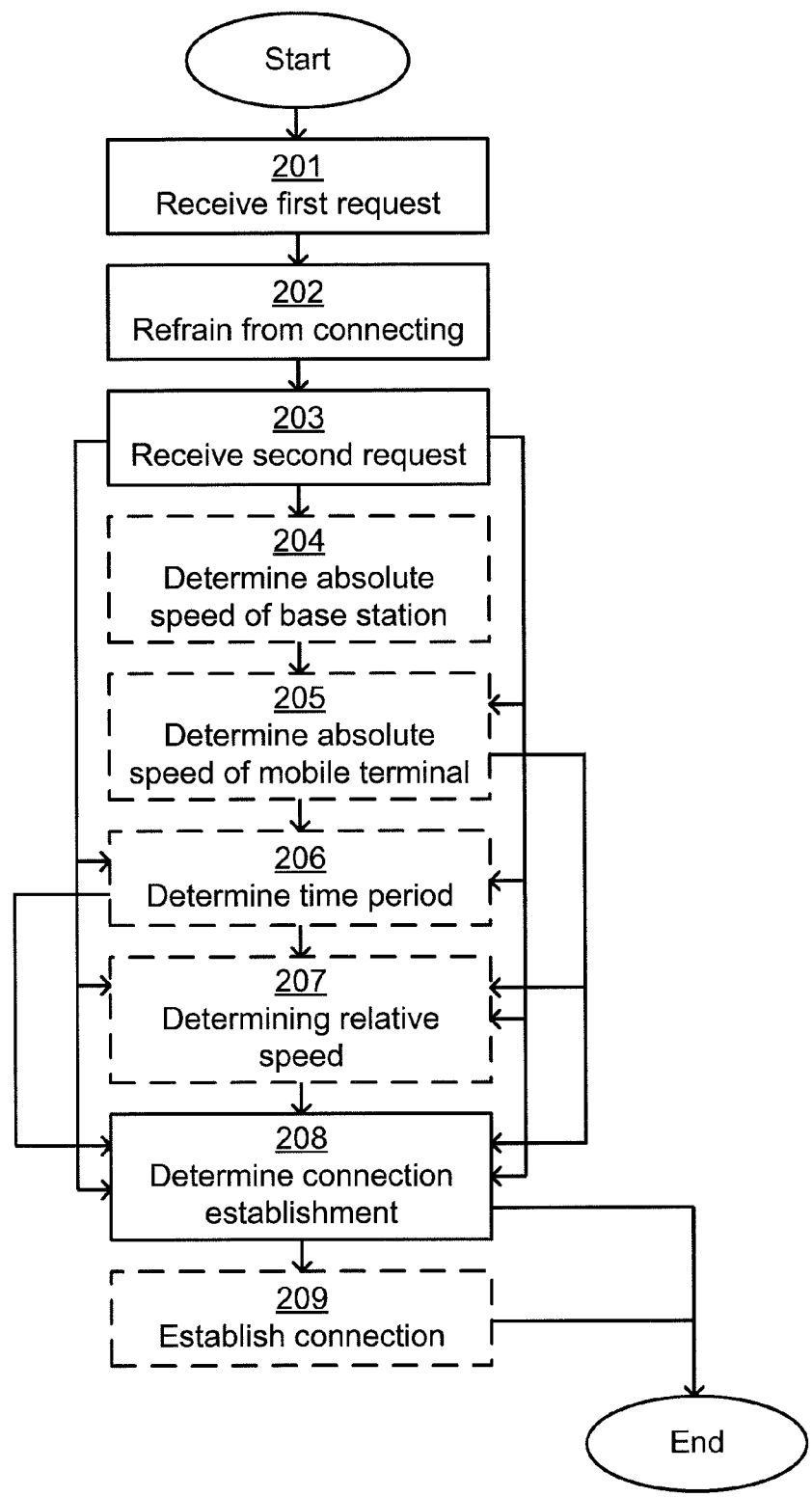
FIG. 2 is a flowchart depicting embodiments of a method in the base station.

Example embodiments of a method in the base station 120 for determining connection establishment between the base station 120 and the mobile terminal 110, will now be described with reference to a flowchart depicted in FIG. 2. As mentioned above the base station 120 is moving.

The method comprises the following actions, which actions may be taken in any suitable order. The actions may also be combined. Dashed lines of some boxes in FIG. 2 indicate that this action is not mandatory.

Action 201

The base station 120 receives a first connection request from the mobile terminal 110. The first connection request indicates that the mobile terminal 110 wants to do a handover or a reselection to the base station 120.

Action 202

As described above it is most favorable for the mobile terminal 110 to connect to the moving base station 120 when the mobile terminal 110 and the base station 120 are moving jointly. Therefore, the base station 120 will not establish the connection when the first connection request is received. First the base station 120 may establish if the base station 120 and the mobile 110 terminal move jointly.

When the base station 120 receives the first connection request, the base station 120 refrains from establishing a connection between the base station 120 and the mobile terminal 110. This is to see if a second connection request will be received within a time period. This may be performed by transmitting a NACK to the mobile terminal 110 or by not transmitting anything at all. The base station 120 then waits for a second connection request from the mobile terminal 110.

Action 203

Since the connection between the base station 120 and the mobile terminal 110 has not been established, the mobile terminal 110 is transmitting the second connection request to the base station 120.

The second connection request from the mobile terminal 110 is received by the base station 120.

An optional mobility indicator may be received from the mobile terminal 110. The mobility indicator may be received in the first connection request or in the second connection request indicating a speed of the mobile terminal 110. The mobility indicator may be a single bit indicating if the mobile terminal 110 is moving or if it is stationary. The mobility indicator may also indicate the absolute speed of the mobile terminal 110 and its direction.

In one alternative of this embodiment, the mobile terminal 110 has a bit-indicator indicating one value if the mobile terminal 110 is moving and another value if the mobile terminal 110 is not moving. Higher granularity of the mobility indicator is also possible. If the mobility indicator comprises of, or is represented with a plurality of bits, the bits may represent different speed values, e.g. one value for no speed, 0 km/h. For example, a value for slow speed, may e.g. be below 5 km/h, a value for medium speed, may e.g. be below 30 km/h, and a value for high speed, may e.g. be above 30 km/h. Even higher granularities are possible to indicate more exact speeds.

The mobility indicator may be dynamically updated depending on the speed of the mobile terminal 110. Even though to have a dynamically changing mobility indicator depending on the current speed of the mobile terminal 110 may require more complexity in the mobile terminal 110, it is more accurate as it will work well for the case when the mobile terminal 110 is used on the vehicle 130 and the mobile terminal 110 will only indicate that it is moving when it is actually moving. There may be some filtering of the mobile terminal's 110 speed with regards to changing the mobility indicator. For example if the vehicle 130 is doing a short stop at a traffic light, the mobile terminal 110 may still indicate that it is moving to avoid a HO will be performed to a base station outside the vehicle 130.

Action 204

In some embodiments, the base station 120 may determine an absolute speed of the base station 120. The absolute speed may be used below to determine if the mobile terminal 110 and the base station 120 are moving jointly, which will be used when determining whether or not to establish the connection between the base station 120 and the mobile terminal 110.

The absolute speed of the base station 120 may e.g. be determined using GPS, or any other suitable means.

Action 205

The base station 120 may determine an absolute speed of the mobile terminal 110. The absolute speed may be used below to determine if the mobile terminal 110 and the base station 120 are moving jointly, which will be used when determining whether or not to establish the connection between the base station 120 and the mobile terminal 110.

The absolute speed of the mobile terminal 110 may e.g. be determined by using triangulation. This involves at least 3 stationary base stations. The triangulation result may then be communicated to the mobile base station 120 via a network interface.

The absolute speed of the mobile terminal 110 may be determined because when the mobile terminal 110 is close to the base station 120 that it is moving along with, connecting to the base station 120 is very beneficial. In particular, the faster the mobile terminal 110 is moving, the more beneficial it becomes as a connection to a stationary base station is more and more challenging the faster the mobile terminal 110 is moving.

Action 206

The base station 120 may determine a time period between the first connection request and the second connection request. The time period may be used below to determine if the mobile terminal 110 and the base station 120 are moving jointly, which will be used when determining whether or not to establish the connection between the base station 120 and the mobile terminal 110.

This may be determined by starting a timer, when first connection request is received. Since the radio coverage of the base station 120 is relatively small, it is unlikely that the mobile terminal 110 sends two connection requests, or at least that such a second connection request is successfully received by the base station 120, if the relative speed between the mobile terminal 110 and the base station 120 is relatively large that is, if they do not move jointly.

Action 207

The base station 120 may determine a parameter indicating a relative speed between the base station 120 and the mobile terminal 110 may be determined. The parameter indicating the relative speed may be determined by calculating the difference of the speed of the base station 120 and the speed of the mobile terminal 110. The relative speed may also be estimated by measuring for instance the Received Signal Strength Indicator (RSSI) of the signal at different connection requests. When the RSSI is similar for different connection requests, the relative speed can be estimated to be relatively low, whereas when there is a large variation of the RSSIs for different connection requests, the relative speed can be estimated to be relatively high. Thus, said parameter indicating the relative speed between the base station 120 and the mobile terminal 110 may be, or be based on, a difference in RSSI values between the first and the second connection request.

Action 208

When the second connection request is received by the base station 120, the base station 120 determines whether or not to establish the connection between the base station 120 and the mobile terminal 110. The determination may be performed in a variety of ways which will be exemplified below.

It may be determined to establish the connection between the base station 120 and the mobile terminal 110 when the absolute speed of the base station 120 is above a first threshold. The first threshold may e.g. be 30 km/h.

It may be determined to establish the connection between the base station 120 and the mobile terminal 110 when the absolute speed of the mobile terminal 110 is above a second threshold. The second threshold may e.g. be 30 km/h.

It may be determined to establish the connection between the base station 120 and the mobile terminal 110 when the time period between the first connection request and the second connection request exceeds a third threshold. The third threshold may e.g. be on the order of 1 second.

The time period may be a fixed time period or it may be dependent on the speed of the base station 120 such that when the base station 120 is not moving, the base station 120 may set the time period to a low value which would then make the mobile terminal 110 do a HO to the base station 120 shortly after the base station 120 has been detected. If the base station 120 is moving the base station 120 may set the time period to a larger value, for example on the order of 1 s, so that a mobile terminal 110 which is not moving jointly with the base station 120 will not do a HO to the base station 120.

In another embodiment the base station 120 measures a signal strength of the mobile terminal 110 and only accepts connection requests from the mobile terminal 110 if the signal strength from the mobile terminal 110 has been stable during a second time period, for example 1 s. The base station 120 may then assume that the relative speed between the base station 120 and the mobile terminal 110 is low.

One way of realizing this embodiment is that the base station 120 will only grant the second connection request from the mobile terminal 110 when a rate of change of a measured signal strength of the mobile terminal 110 is below a threshold for a third time period. Otherwise the base station 120 may refrain from granting the second connection request from the mobile terminal 110 for example by rejecting the connection request from the mobile terminal 110.

Another way of realizing this embodiment is that the mobile terminal 110 will be allowed to connect to the base station 120 if the measured signal strength is above a threshold for fourth time period, for example 1 s.

It may be determined to establish the connection between the base station 120 and the mobile terminal 110 when the parameter indicating the relative speed indicates that the relative speed between the base station 120 and the mobile terminal 110 is below a fourth threshold, for example 6 km/h corresponding walking speed.

For embodiments in which a mobility indicator is sent from the mobile terminal 110, it may be determined to establish the connection between the base station 120 and the mobile terminal 110 when the mobility indicator indicates that the speed of the mobile terminal 110 is above a fifth threshold, for example 30 km/h.

Action 209

After deciding to establish the connection between the base station 120 and the mobile terminal 110, the connection may be established by the base station 120 by transmitting a connection grant to the mobile terminal 110 and the handover is then performed.

Figure 3:
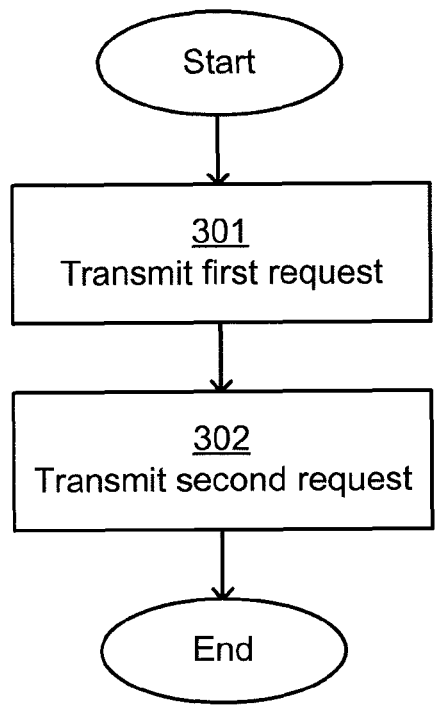
FIG. 3 is a flowchart depicting embodiments of a method in the mobile terminal.

Example embodiments of a method in the mobile terminal 110 for assisting a base station 120 in determining connection establishment between the base station 120 and the mobile terminal 110, will now be described with reference to a flowchart depicted in FIG. 3. As mentioned above the base station 120 is moving.

The method comprises the following actions, which actions may be taken in any suitable order. The actions may also be combined.

Action 301

When the mobile terminal 110 detects the base station 120 and wants to do a HO to the base station, the mobile terminal 110 transmits a first connection request to the base station 120. The mobile terminal 110 then waits for a connection grant from the base station 120.

Action 302

If the connection request grant is not received, and the connection is not established within a time period, the mobile terminal 110 transmits a second connection request to the base station 120.

In at least one of the first connection request and the second connection request a mobility indicator may be comprised. The mobility indicator indicates a speed of the mobile terminal 110.

The mobility indicator may comprise one bit indicating if the speed of the mobile terminal 110 is above or below a speed threshold.

The mobility indicator may comprise a plurality of bits representing a plurality of different speed ranges.

The mobility indicator may also include information about in which direction the mobile terminal 110 is moving.

The mobile terminal 110 them waits for a connection grant from the base station 120.

Figure 4:
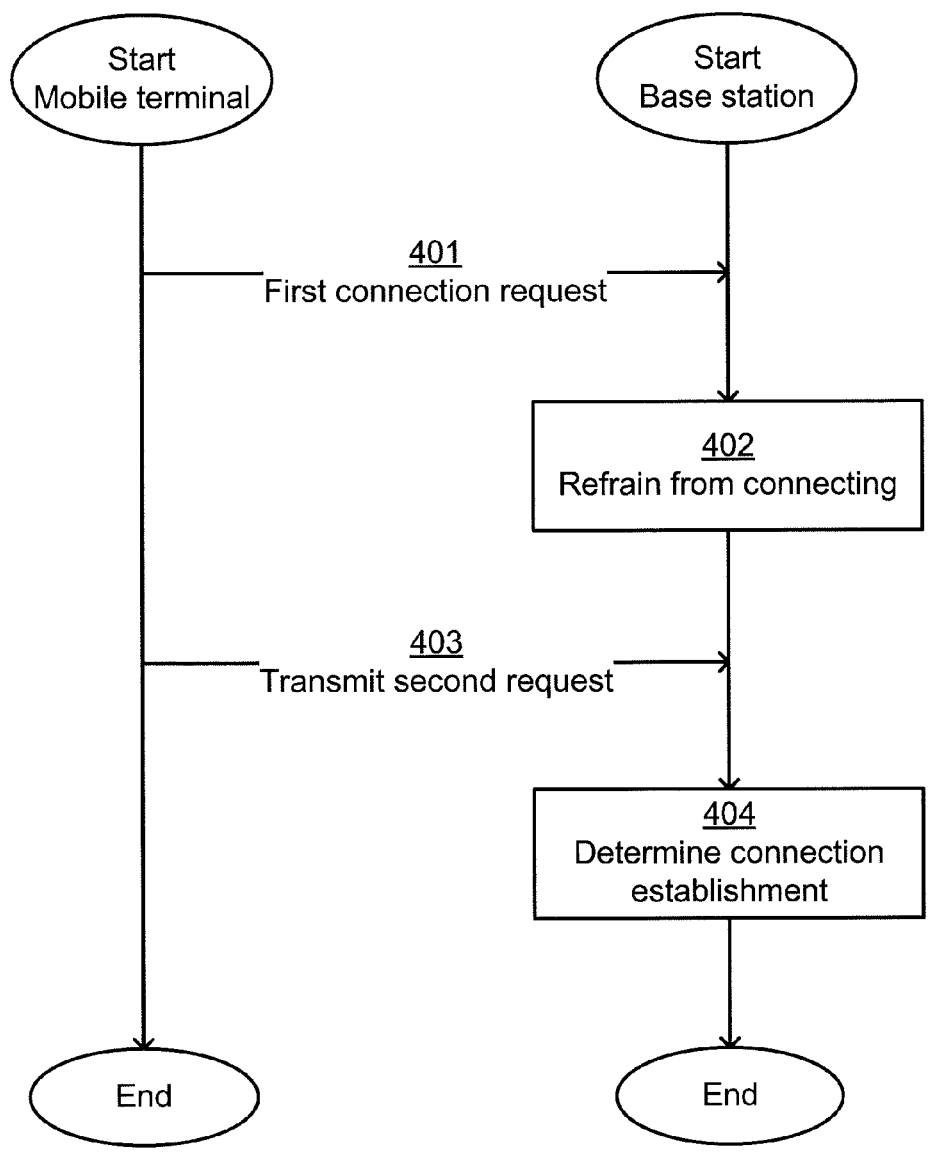
FIG. 4 is a signaling diagram depicting embodiments of a method in the wireless communication system.

Example embodiments of the wireless communication system 100 for determining connection establishment between a base station 120 and a mobile terminal 110 will now be described with reference to signalling diagram depicted in FIG. 4. As mentioned above the base station 120 is movable.

The method comprises the following actions, which actions may be taken in any suitable order. The actions may also be combined.

Action 401

The mobile terminal 110 is continuously measuring the signal quality from neighbor base stations 120, to find a potential handover candidate. The base station 120 is detected when the mobile terminal 110 can decode broadcast information from the base station 120. When the mobile terminal 110 detects the base station 120 and wants to perform a handover the mobile terminal 110 transmits a first connection request to the base station 120, i.e. the base station 120 receives the first connection request from the mobile terminal 110.

Action 402

It is most favorable to set up the connection between the mobile terminal 110 and the base station 120 when they are moving jointly. An example of when a mobile terminal and a base station move jointly is when they are both located on a bus or on a train that moves. An important property of such a situation is that the relative speed between the mobile terminal 110 and the base station 120 is relatively small compared with the absolute speed of any of the mobile terminal 110 and the base station 120. A way to determine if they are moving jointly will be described below. When the first connection request is received by the base station 120, the base station 120 refrains from establishing a connection between the base station 120 and the mobile terminal 110. This may be performed by transmitting a NACK to the mobile terminal 110 or by not transmitting anything at all. The base station 120 is then waiting for a second connection request from the mobile terminal 110.

Action 403

Since the connection between the base station 120 and the mobile terminal 110 has not been established, the mobile terminal 110 transmits a second connection request to the base station 120. The time period between the first connection request and the second connection request may be on the order of one second.

The base station 120 receives the second connection request from the mobile terminal 110. Since the radio coverage area of the base station 120 is small, it may be an indication that the mobile terminal 110 and the base station 120 move jointly if the mobile terminal 110 can hear the base station 120 constantly during the time period between transmitting the first connection request and the second connection request.

In at least one of the first connection request and the second connection request a mobility indicator is included. The mobility indicator indicates a speed of the mobile terminal 110. The mobility indicator may be a single bit indicating if the mobile terminal 110 is moving or if it is stationary. The mobility indicator may also indicate the absolute speed of the mobile terminal 110 and its direction.

Action 404

When the second connection request is received by the base station 120, the base station 120 determines whether or not to establish the connection between the base station 120 and the mobile terminal 110. The base station 120 may e.g. determine to establish the connection between the base station 120 and the mobile terminal 110 when it is determined that the base station 120 and the mobile terminal moves jointly. The base station 120 may determine based in the mobility indicator whether or not to establish the connection between the base station 120 and the mobile terminal 110. If the base station 120 knows its own absolute speed it may determine a relative speed between the mobile terminal 110 and the base station 120 based on the received mobility indicator.

How the determination may be performed is further exemplified above in action 208.

Figure 5:
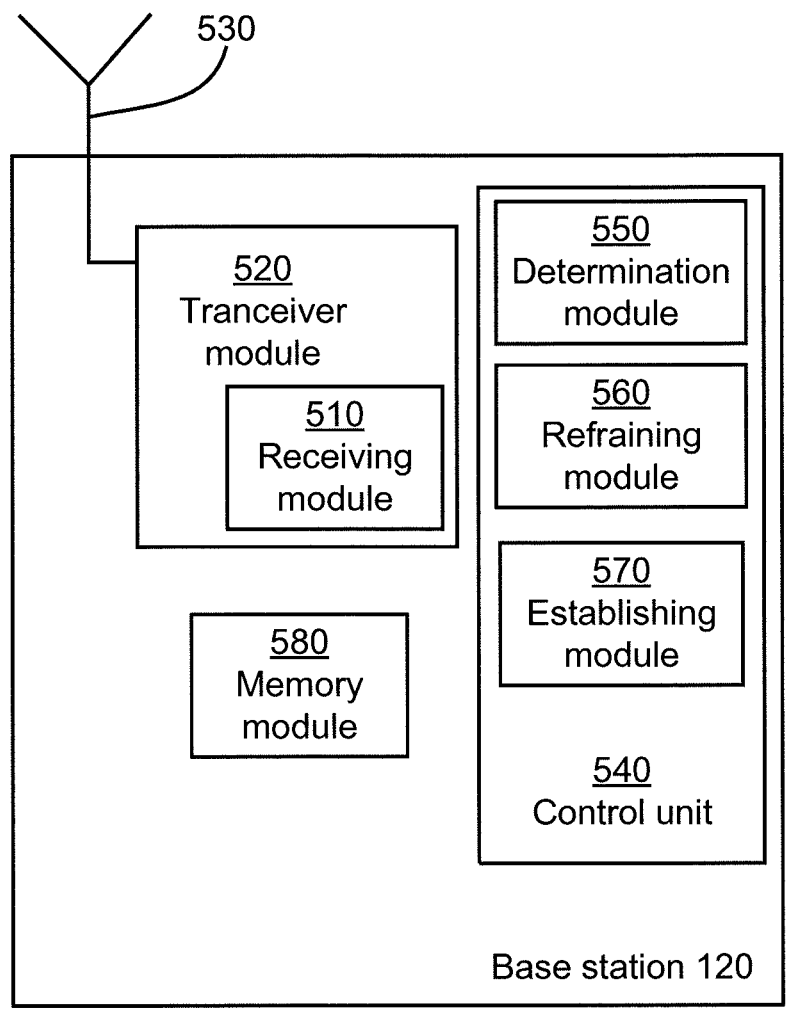
FIG. 5 is a schematic block diagram illustrating the base station according to some embodiments.

To perform the method actions to determine connection establishment between the base station 120 and a mobile terminal 110, described above in relation to FIG. 2, the base station 120 may comprises the following arrangement depicted in FIG. 5. As mentioned above the base station 120 is movable.

In some embodiments the base station 120 comprises a receiving module 510 adapted to receive signals transmitted from the mobile terminal 110. The receiving module 510 may be part of a transceiver module 520. The transceiver module 520 may also transmit signals to mobile terminal 110. An antenna 530 may be connected to the transceiver module 520.

The base station 120 comprises a control unit 540 adapted to, when the base station 120 is moving, receive the first connection request from the mobile terminal 110, e.g. via the receiving module 510.

The control unit 540 is further adapted to determine whether or not to establish the connection between the base station 120 and the mobile terminal 110. The control unit 540 may e.g. comprise a determination module 550 adapted to determine whether or not to establish the connection between the base station 120 and the mobile terminal 110. The control unit 540 is further adapted to refrain from establishing the connection between the base station 120 and the mobile terminal 110 when the first connection request is received. The control unit 540 may e.g. comprise a refraining module 560 adapted to refrain from establishing the connection between the base station 120 and the mobile terminal 110 when the first connection request is received.

The control unit 540 is further adapted to, when the base station 120 is moving, receive a second connection request from the mobile terminal 110, e.g. via the receiving module 510. The control unit 540 is further adapted to determine whether or not to establish the connection between the base station 120 and the mobile terminal 110 when the second connection request is received. For example, the determination module 550 may be further adapted to determine whether or not to establish the connection between the base station 120 and the mobile terminal 110 when the second connection request is received.

The control unit 540 is adapted to establish the connection between the base station 120 and the mobile terminal 110 when it has been determined that this should be done. For this purpose, as illustrated in FIG. 5, the control unit 540 may comprise an establishing module 570 adapted to establish said connection.

The control unit 540 may further be adapted to determine an absolute speed of the base station 120. For example, the determination module 550 may further be adapted to determine the absolute speed of the base station 120.

The control unit 540 may further be adapted to establish the connection between the base station 120 and the mobile terminal 110 when the absolute speed of the base station 120 is above a first threshold. For example, the establishing module 570 may be adapted to establish the connection between the base station 120 and the mobile terminal 110 when the absolute speed of the base station 120 is above the first threshold.

The control unit 540 may further be adapted to determine an absolute speed of the mobile terminal 110. For example, the determination module 550 may further be adapted to determine an absolute speed of the mobile terminal 110.

The control unit 540 may further be adapted to establish the connection between the base station 120 and the mobile terminal 110 when the absolute speed of the mobile terminal 110 is above a second threshold. For example, the establishing module 570 may be adapted to establish the connection between the base station 120 and the mobile terminal 110 when the absolute speed of the mobile terminal 110 is above the second threshold.

The control unit 540 may further be adapted to determine a time period between the first connection request and the second connection request. For example, the determination module 550 may be adapted to determine said time period between the first connection request and the second connection request.

The control unit 540 may further be adapted to establish the connection between the base station 120 and the mobile terminal 110 when the time period between the first connection request and the second connection request exceeds a third threshold. For example the establishing module 570 may be adapted to establish the connection between the base station 120 and the mobile terminal 110.

The control unit 540 may further be adapted to determine a parameter indicating a relative speed between the base station 120 and the mobile terminal 110. For example the determination module 550 may be adapted to determine the parameter indicating a relative speed between the base station 120 and the mobile terminal 110.

The control unit 540 may further be adapted to establish the connection between the base station 120 and the mobile terminal 110 when the parameter indicates that the relative speed between the base station 120 and the mobile terminal 110 is below a fourth threshold. For example the establishing module 570 may be adapted to establish the connection between the base station 120 and the mobile terminal 110 when the parameter indicates that the relative speed between the base station 120 and the mobile terminal 110 is below a fourth threshold.

The control unit 540 may further be adapted to receive a mobility indicator from the mobile terminal 110, indicating a speed of the mobile terminal 110. For example the control unit 540 may be adapted to receive a mobility indicator from the mobile terminal 110, indicating a speed of the mobile terminal 110 via the receiving module 510.

The control unit 540 may further be adapted to establish the connection between the base station 120 and the mobile terminal 110 when the mobility indicator indicates that the speed of the mobile terminal 110 is above a fifth threshold. For example the establishing module 570 may be adapted to establish the connection between the base station 120 and the mobile terminal 110 when the mobility indicator indicates that the speed of the mobile terminal 110 is above a fifth threshold.

The mobility indicator may be included in the first connection request or the second connection request.

In some embodiments, the control unit 540 may be implemented as a dedicated application-specific hardware unit. Alternatively, said control unit 540, or parts thereof, may be implemented with programmable and/or configurable hardware units, such as but not limited to one or more Field-Programmable Gate Arrays (FPGAs), processors, or microcontrollers. Thus, the control unit 540 may be a programmable control unit. The control unit 540 and a memory module 580 may perform the actions of the determination module 550 and the establishing module 570 described above.

The base station 120 may further comprise the memory module 580 comprising one or more memory units. The memory module 570 may comprise instructions executable by the programmable control unit 540.

The memory module 580 may be arranged to be used to store, data, configurations, schedulings, and applications to perform the methods herein when being executed in the base station 120, e.g. by the control unit 540.

Figure 6:
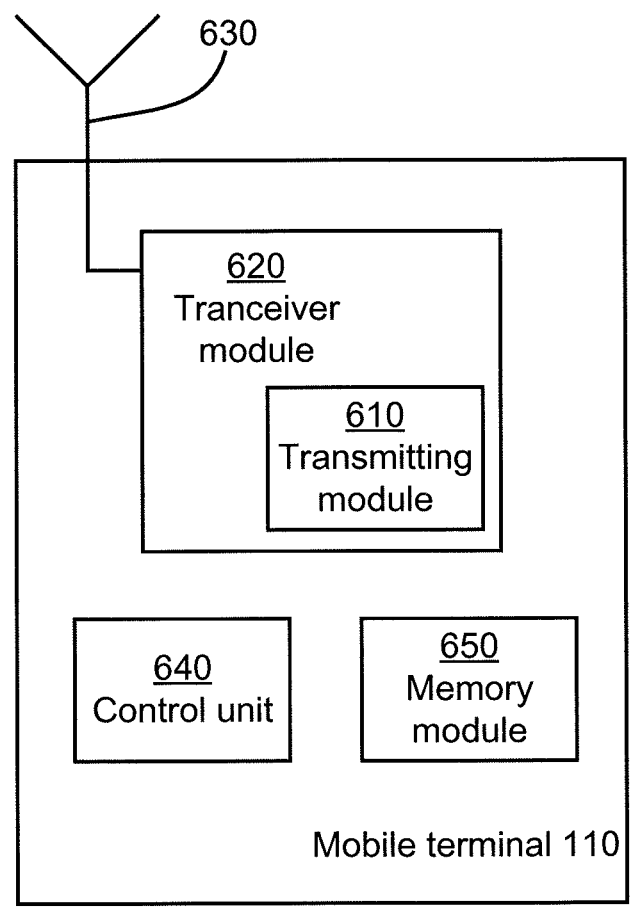
FIG. 6 is a schematic block diagram illustrating the mobile terminal according to some embodiments.

To perform the method actions assisting a base station 120 in determining connection establishment between the base station 120 and a mobile terminal 110, where the base station 120 is moving described above in relation to FIG. 3, the mobile terminal 110 may comprises the following arrangement depicted in FIG. 6.

In FIG. 6, the mobile terminal 110 comprises a transmitting module 610 adapted to transmit signals to the base station 120. The transmitting module 610 may be part of a transceiver module 620. The transceiver module 620 may also receive signals from the base station 120. An antenna 630 may be connected to the transceiver module 620.

The mobile terminal 110 comprises a control unit 640 adapted to transmit a first connection request to the base station 120, for example via the transmitting module 610.

The control unit 640 is further adapted to if, a connection has not been established within a time period, transmit a second connection request to the base station 120, e.g. via the transmitting module 610.

According to some embodiments, the above-mentioned mobility indicator is included in at least one of the first connection request and the second connection request, indicating the speed of the mobile terminal 110.

The mobility indicator may comprise one bit indicating if the speed of the mobile terminal 110 is above or below a speed threshold.

The mobility indicator may comprise, or be represented with, a plurality of bits and thereby represent a plurality of different speed ranges.

In some embodiments, the control unit 640 may be implemented as a dedicated application-specific hardware unit. Alternatively, said control unit 640, or parts thereof, may be implemented with programmable and/or configurable hardware units, such as but not limited to one or more FPGAs, processors, or microcontrollers. Thus, the control unit 640 may be a programmable control unit. The mobile terminal 110 may further comprise a memory module 650 comprising one or more memory units. The memory module 650 may comprise instructions executable by the programmable control unit 640.

The memory module 650 may be arranged to be used to store, data, configurations, schedulings, and applications to perform the methods herein when being executed in the mobile terminal 110.

The embodiments herein handling the process of determining connection establishment may be implemented through one or more processors, such as the control unit 540 in the base station 120 and the control unit 640 in the mobile terminal 110 depicted in FIG. 5 and FIG. 6, together with computer program code for performing the functions and actions of the embodiments herein. The program code mentioned above may also be provided as a computer program product, for instance in the form of a data carrier carrying computer program code for performing the embodiments herein when being loaded into the in the base station 120. One such carrier may be in the form of non-transitory computer-readable medium, such as a CD ROM disc, a memory stick, flash memory, etc. The computer program code may furthermore be provided as pure program code on a server and downloaded to the base station 120 or the mobile terminal 110.

When using the word "comprise" or "comprising" it shall be interpreted as non-limiting, i.e. meaning "consist at least of".

The embodiments herein are not limited to the above-described preferred embodiments. Various alternatives, modifications and equivalents may be used. Therefore, the embodiments should not be taken as limiting the scope of the invention, which is defined by the appending claims.

The invention claimed is:

1. A method in a base station for determining connection establishment between the base station and a mobile terminal, the method comprising:
in response to receiving a first connection request from the mobile terminal, refraining from establishing a connection between the base station and the mobile terminal, and waiting for a second connection request from the mobile terminal;
in response to receiving the second connection request from the mobile terminal, performing:
determining a time period between the first connection request and the second connection request;
determining whether or not the mobile terminal and the base station are moving together by considering one or more of: an absolute speed of the base station, an absolute speed of the mobile terminal, and a relative speed between the base station and the mobile terminal; and
establishing the connection between the base station and the mobile terminal when the time period between the first connection request and the second connection request exceeds a third threshold and it is determined that the mobile terminal and the base station are moving together, and not establishing the connection otherwise,
wherein the base station is movable.

2. The method according to claim 1, further comprising:
determining the absolute speed of the base station; and
wherein determining whether or not the mobile terminal and the base station are moving together comprises:
determining whether or not the absolute speed of the base station is above a first threshold.

3. The method according to claim 1, further comprising:
determining the absolute speed of the mobile terminal; and
wherein determining whether or not the mobile terminal and the base station are moving together comprises:
determining whether or not the absolute speed of the mobile terminal is above a second threshold.

4. The method according to claim 1, further comprises:
determining a parameter indicating the relative speed between the base station and the mobile terminal; and
wherein determining whether or not the mobile terminal and the base station are moving together comprises:
determining whether or not the parameter indicates that the relative speed between the base station and the mobile terminal is below a fourth threshold.

5. The method according to claim 1, comprising:
receiving a mobility indicator from the mobile terminal, which mobility indicator indicates the absolute speed of the mobile terminal, and
wherein determining whether or not the mobile terminal and the base station are moving together comprises:
determining whether or not the mobility indicator indicates that the speed of the mobile terminal is above a fifth threshold.

6. The method according to claim 5, wherein the mobility indicator is included in the first connection request or in the second connection request.

7. A base station adapted to determine connection establishment between the base station and a mobile terminal, the base station comprises a control unit adapted to:
receive a first connection request from the mobile terminal;
refrain from establishing the connection between the base station and the mobile terminal when the first connection request is received, and waiting for a second connection request from the mobile terminal;
receive the second connection request from the mobile terminal;
determine a time period between the first connection request and the second connection request;
determine whether or not the mobile terminal and the base station are moving together by considering one or more of: an absolute speed of the base station, an absolute speed of the mobile terminal, and a relative speed between the base station and the mobile terminal; and
establish the connection between the base station and the mobile terminal when the time period between the first connection request and the second connection request exceeds a third threshold and it is determined that the mobile terminal and the base station are moving together, and not establishing the connection otherwise,
wherein the base station is movable.

8. The base station according to claim 7, wherein the control unit is further adapted to:
determine the absolute speed of the base station;
wherein determining whether or not the mobile terminal and the base station are moving together comprises:
determining whether or not the absolute speed of the base station is above a first threshold.

9. The base station according to claim 7, wherein the control unit is further adapted to:
determine the absolute speed of the mobile terminal;
wherein determining whether or not the mobile terminal and the base station are moving together comprises:
determining whether or not the absolute speed of the mobile terminal is above a second threshold.

10. The base station according to claim 7, wherein the control unit is further adapted to:
determine a parameter indicating the relative speed between the base station and the mobile terminal;
wherein determining whether or not the mobile terminal and the base station are moving together comprises:

determining whether or not the parameter indicates that the relative speed between the base station and the mobile terminal is below a fourth threshold.

11. The base station according to claim 7, wherein the control unit is further adapted to:
   receive a mobility indicator from the mobile terminal, indicating the absolute speed of the mobile terminal;
   wherein determining whether or not the mobile terminal and the base station are moving together comprises:
   determining whether or not the mobility indicator indicates that the speed of the mobile terminal is above a fifth threshold.

12. The base station according to claim 11, wherein the mobility indicator is included in the first connection request or the second connection request.

13. A non-transitory computer readable storage medium having stored thereon a computer program product comprising computer program code for executing a method when said computer program code is executed by a programmable control unit of the base station, wherein the method is in the base station and is for determining connection establishment between the base station and a mobile terminal, the method comprising:

in response to receiving a first connection request from the mobile terminal, refraining from establishing a connection between the base station and the mobile terminal, and waiting for a second connection request from the mobile terminal;

in response to receiving the second connection request from the mobile terminal, performing:

determining a time period between the first connection request and the second connection request;

determining whether or not the mobile terminal and the base station are moving together by considering one or more of: an absolute speed of the base station, an absolute speed of the mobile terminal, and a relative speed between the base station and the mobile terminal; and establishing the connection between the base station and the mobile terminal when the time period between the first connection request and the second connection request exceeds a third threshold and it is determined that the mobile terminal and the base station are moving together, and not establishing the connection otherwise, wherein the base station is movable.

* * * * *